(12) United States Patent
Sharkus et al.

(10) Patent No.: US 11,952,007 B1
(45) Date of Patent: Apr. 9, 2024

(54) METHODS AND SYSTEMS FOR DETECTING BLIND SPOTS

(71) Applicant: GM GLOBAL TECHNOLOGY OPERATIONS LLC, Detroit, MI (US)

(72) Inventors: Noah Sharkus, Grosse Ile, MI (US); Prabhjot Kaur, Auburn Hills, MI (US); Nicholas Constantine Sidiropoulos, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 4 days.

(21) Appl. No.: 17/937,533

(22) Filed: Oct. 3, 2022

(51) Int. Cl.
*B60W 50/14* (2020.01)
*B60W 40/04* (2006.01)
*B60W 40/08* (2012.01)
*B60W 60/00* (2020.01)

(52) U.S. Cl.
CPC ............ *B60W 50/14* (2013.01); *B60W 40/04* (2013.01); *B60W 40/08* (2013.01); *B60W 60/001* (2020.02); *B60W 2540/223* (2020.02); *B60W 2554/4041* (2020.02)

(58) Field of Classification Search
None
See application file for complete search history.

(56) References Cited

U.S. PATENT DOCUMENTS

| 2008/0012938 A1* | 1/2008 | Kubota | B60Q 9/008 348/118 |
| 2019/0088011 A1* | 3/2019 | Liu | G06T 15/20 |

\* cited by examiner

*Primary Examiner* — Thomas S McCormack
(74) *Attorney, Agent, or Firm* — Lorenz & Kopf LLP

(57) ABSTRACT

Systems and methods are provided for detecting a blind spot of a vehicle. In one embodiment, a method includes: receiving, by a processor, head position data indicating a position of a head of a driver of the vehicle; determining, by the processor, pillar position data associated with at least one pillar of the vehicle; determining, by the processor, at least one angle based on the head position data and the pillar position data; determining, by the processor, at least one blind spot area based on the at least one angle; detecting, by the processor, at least one object within the at least one blind spot area; and generating at least one of notification data, decision data, and control data based on the at least one object.

20 Claims, 4 Drawing Sheets

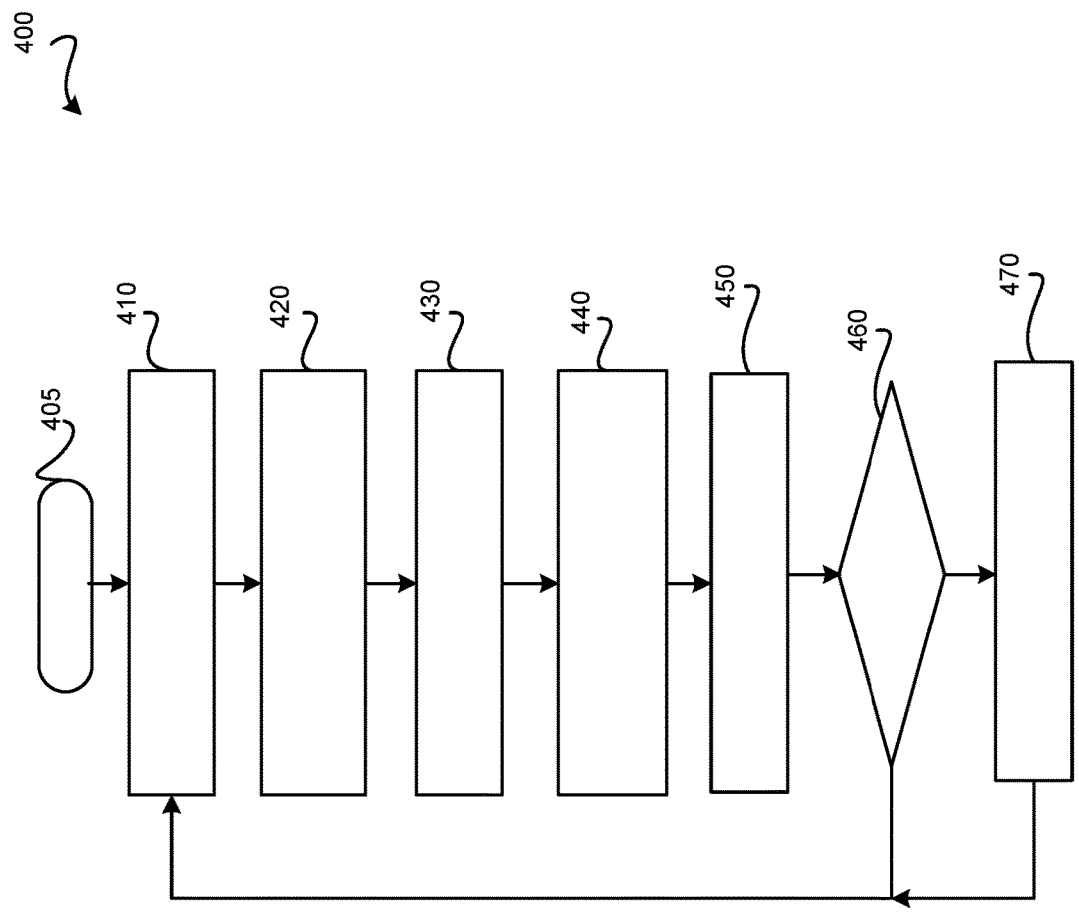

METHODS AND SYSTEMS FOR DETECTING BLIND SPOTS

INTRODUCTION

The present disclosure generally relates to vehicles, and more particularly relates to methods and systems for detecting blind spot areas relative to a vehicle.

A vehicle body is generally constructed with four or more supports for the roof, referred to as pillars. The pillars extend in a near vertical or inclined position between window areas. An "A" pillar extends between the windshield and a front side window of the vehicle. Many larger vehicles such as vans, trucks, and sport utility vehicles (SUV) can have a relatively large A pillars, for a variety of reasons such as rollover safety and to contain wiring harnesses and handles. A large A pillar can block the field of view of a driver and create blind spot areas within the vehicle's environment. The blind spot areas may have objects that may enter the vehicle's path. These objects may be undetectable by the driver.

Accordingly, it is desirable to provide improved systems and methods for detecting a blind spot area relative to a vehicle. Furthermore, other desirable features and characteristics of the present disclosure will become apparent from the subsequent detailed description and the appended claims, taken in conjunction with the accompanying drawings and the foregoing technical field and background.

SUMMARY

Systems and methods are provided for detecting a blind spot of a vehicle. In one embodiment, a method includes: receiving, by a processor, head position data indicating a position of a head of a driver of the vehicle; determining, by the processor, pillar position data associated with at least one pillar of the vehicle; determining, by the processor, at least one angle based on the head position data and the pillar position data; determining, by the processor, at least one blind spot area based on the at least one angle; detecting, by the processor, at least one object within the at least one blind spot area; and generating at least one of notification data, decision data, and control data based on the at least one object.

In various embodiments, the at least one pillar is a left front pillar of the vehicle.

In various embodiments, the at least one pillar is a right front pillar of the vehicle.

In various embodiments, the pillar position data includes a coordinate of a first point associated with a first edge of the at least one pillar and a coordinate of a second point associated with a second edge of the at least one pillar.

In various embodiments, the coordinate of the first point and the coordinate of the second point are two-dimensional coordinates.

In various embodiments, the first edge is a front edge that faces a forward direction of the vehicle, and wherein the second edge is a back edge that faces a backward direction of the vehicle.

In various embodiments, the determining the at least one angle is based on a relationship:

$$\theta = \text{Arctan}\left[\frac{\frac{H_y - A_y}{H_x - A_x} - \frac{H_y - B_y}{H_x - B_x}}{1 + \left(\frac{H_y - A_y}{H_x - A_x}\right) * \left(\frac{H_y - B_y}{H_x - B_x}\right)}\right]$$

where Hxy represents the coordinates of the position of the head of the driver, Axy represents the coordinates of the position of the front edge of the at least one pillar, and Bxy represents the position of the back edge of the at least one pillar.

In various embodiments, the generating includes generating notification data, and wherein the notification data includes information associated with the detected object in the blind spot area.

In various embodiments, the generating includes generating the decision data, and wherein the decision data is associated with an action of at least one of the vehicle and the driver.

In various embodiments, the generating includes generating the control data, and wherein the control data controls at least one actuator of the vehicle.

In various embodiments, the determining the at least one blind spot area is further based on a position of the pillar and a defined distance from the vehicle.

In another embodiment, a system includes: a sensor system configured to provide head position data associated with a head of a driver of the vehicle; a data storage system configured to provide pillar position data associated with at least one pillar of the vehicle; and a processor configured to receive the head position data and the pillar position data, determine at least one angle based on the head position data and the pillar position data, determine at least one blind spot area based on the at least one angle, detect at least one object within the at least one blind spot area, and generate at least one of notification data, decision data, and control data based on the at least one object.

In various embodiments, the at least one pillar is a left front pillar of the vehicle or a right front pillar of the vehicle.

In various embodiments, the pillar position data includes a coordinate of a first point associated with a first edge of the at least one pillar and a coordinate of a second point associated with a second edge of the at least one pillar.

In various embodiments, the coordinate of the first point and the coordinate of the second point are two-dimensional coordinates.

In various embodiments, the first edge is a front edge that faces a forward direction of the vehicle, and wherein the second edge is a back edge that faces a backward direction of the vehicle.

In various embodiments, the determining the at least one angle is based on a relationship $$\theta = \text{Arctan}\left[\frac{\frac{H_y - A_y}{H_x - A_x} - \frac{H_y - B_y}{H_x - B_x}}{1 + \left(\frac{H_y - A_y}{H_x - A_x}\right) * \left(\frac{H_y - B_y}{H_x - B_x}\right)}\right]$$

where Hxy represents the coordinates of the position of the head of the driver, Axy represents the coordinates of the position of the front edge of the at least one pillar, and Bxy represents the position of the back edge of the at least one pillar.

In various embodiments, the generating includes generating notification data, and wherein the notification data includes information associated with the detected object in the blind spot area.

In various embodiments, the generating includes generating the decision data, and wherein the decision data is associated with an action of at least one of the vehicle and the driver.

In various embodiments, the generating includes generating the control data, and wherein the control data controls at least one actuator of the vehicle.

BRIEF DESCRIPTION OF THE DRAWINGS

The exemplary embodiments will hereinafter be described in conjunction with the following drawing figures, wherein like numerals denote like elements, and wherein:

FIG. 4 is a flowchart illustrating a blind spot detection method that may be performed by the blind spot detection system, in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
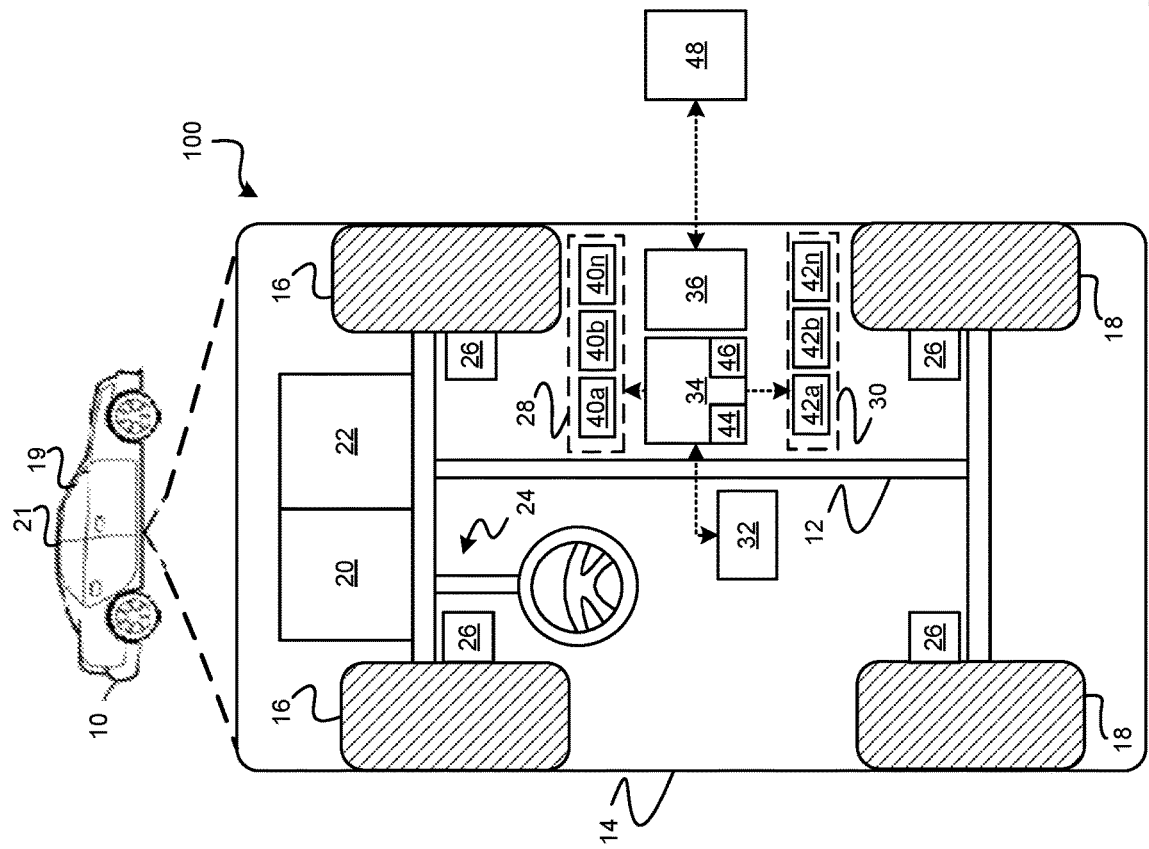
FIG. 1 is a functional block diagram illustrating a vehicle having a blind spot detection system, in accordance with various embodiments.

With reference to FIG. 1, a blind spot detection system shown generally at 100 is associated with a vehicle 10 in accordance with various embodiments. In general, the blind spot detection system 100 dynamically determines blind spot areas for a driver of the vehicle 10 when navigating the environment. In various embodiments, the vehicle 10 uses the blind spot area to make decisions about and control the vehicle 10 when navigating through the environment. In various embodiments, the vehicle 10 uses the blind spot area to generate notification signals to the driver of the vehicle 10 or drivers of other vehicles (not shown).

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The body 14 includes two or more front pillars 19 (referred to as "A" pillars) that support a roof 21 of the vehicle 10. The wheels 16-18 are each rotationally coupled to the chassis 12 near a respective corner of the body 14.

In various embodiments, the vehicle 10 is an autonomous vehicle and the blind spot detection system 100 is incorporated into the autonomous vehicle 10. The autonomous vehicle 10 is, for example, a vehicle that is automatically controlled to carry passengers from one location to another. The vehicle 10 is depicted in the illustrated embodiment as a passenger car, but it should be appreciated that any other vehicle including trucks, sport utility vehicles (SUVs), recreational vehicles (RVs), or simply robots, etc., having pillars and a roof can also be used. In an exemplary embodiment, the autonomous vehicle 10 is a so-called Level One, Level Two, Level Three, or Level Four automation system. A Level Four system indicates "high automation", where the autonomous driving system is fully capable of monitoring the driving environment and handling driving functions for routine routes and conditions defined with an operation design domain. A Level One system indicates "low automation" or driver assistance where autonomous driving system takes control of vehicle functions based on driver interactions. As can be appreciated, in various embodiments, the vehicle 10 can be any level of automation or have no automation at all.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. In various embodiments, the sensing devices 40a-40n include one or more sensors that sense a position of a head of a driver of the vehicle 10.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc.

Figure 2:
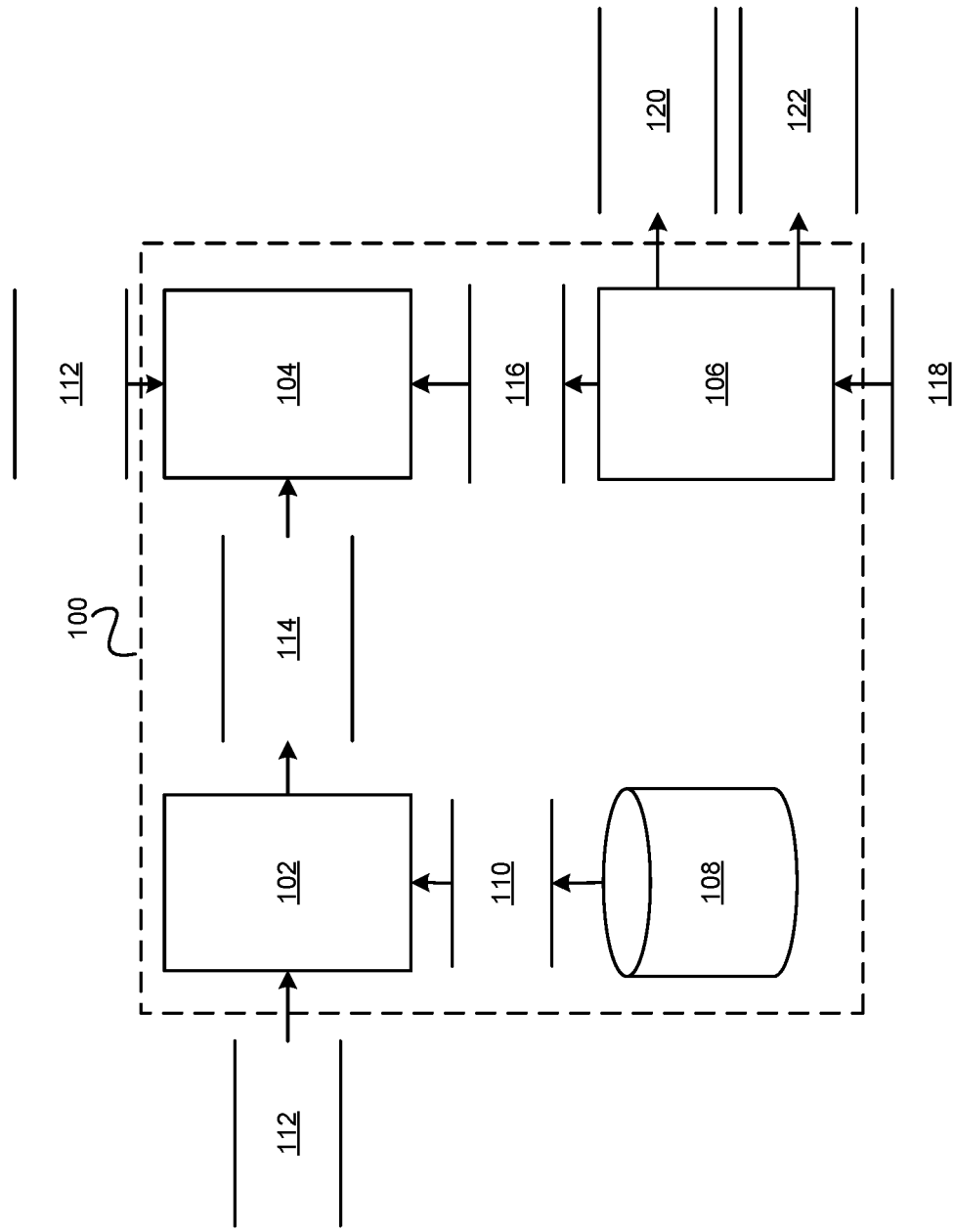
FIG. 2 is a dataflow diagram illustrating the blind spot detection system, in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps are built from the sensor data of the vehicle 10. In various embodiments, the maps are received from a remote system and/or other vehicles. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the blind spot detection system 100 and, when executed by the processor 44, receive sensor data from the sensor system 28 including data indicating a position of a head of a driver, and in response thereto dynamically determine blind spot areas associated with one or more pillars 19 of the vehicle 10 when navigating the environment. In various embodiments, the instructions, when executed by the processor 44, use the blind spot areas to make decisions about and control the vehicle 10 when navigating through the environment. In various embodiments, the instructions, when executed by the processor 44, use the blind spot area to generate notification signals to the driver of the vehicle 10 or drivers of other vehicles (not shown).

As can be appreciated, the controller 34 may be implemented as multiple controllers including at least one residing on the vehicle 10 and at least one residing remote from the vehicle 10. In such embodiments, functions of the blind spot detection system 100 may be implemented on any of the controllers 34, including partially on a first controller of the vehicle 10 and partially on a second controller residing for example on a server system (not shown).

With reference now to FIG. 2 and with continued reference to FIG. 1, a dataflow diagram illustrates the blind spot detection system 100 in accordance with various embodiments. As can be appreciated, various embodiments of the blind spot detection system 100 according to the present disclosure may include any number of modules which may be combined and/or further partitioned to similarly implement systems and methods described herein. Furthermore, inputs to the blind spot detection system 100 may be received from the sensor system 28, the communication system 36, other modules within the controller 34, and/or from other controllers (not shown). Furthermore, the inputs might also be subjected to preprocessing, such as sub-sampling, noise-reduction, normalization, feature-extraction, missing data reduction, and the like. In various embodiments, the blind spot detection system 100 includes an angle determination module 102, an area determination module 104, a blind spot monitoring module 106, and a pillar data datastore 108.

In various embodiments, the pillar data datastore 108 stores pillar position data 110 for each of the front pillars 19 of the vehicle 10. For example, as shown in a top-down view of a cabin 200 of the vehicle 10 in FIG. 3, the pillar data datastore 108 stores for each pillar 19, an x, y coordinate of point 202, 204 of a back edge of the pillar 19a, 19b respectively and an x, y coordinate of a point 206, 208 of a front edge of the pillar 19a, 19b respectively. In various embodiments, the coordinates may be derived from predefined vehicle dimensions and prestored as calibrations in the pillar data datastore 108.

With reference back to FIG. 2, in various embodiments, the angle determination module 102 receives as input head position data 112. The head position data 112 indicates an x, y position of a point 210 (FIG. 3) of a head of the driver of the vehicle 10 as indicated by the sensors of the sensor system 28. The angle determination module 102 retrieves the pillar position data 110 for each pillar 19 from the pillar data datastore 108. The angle determination module 102 computes an angle θa, θb (FIG. 3) based on the head position data 112 and the pillar position data 110 and generates angle data 114 based thereon.

For example, the angle determination module 102 computes an angle θ based on the following relationship:

$$\theta = \text{Arctan}\left[\frac{\frac{H_y - A_y}{H_x - A_x} - \frac{H_y - B_y}{H_x - B_x}}{1 + \left(\frac{H_y - A_y}{H_x - A_x}\right) * \left(\frac{H_y - B_y}{H_x - B_x}\right)}\right]. \quad (1)$$

Where Hxy represents the coordinates of the position of the head of the driver, Axy represents the coordinates of the position of the front edge of the pillar 19, and Bxy represents the position of the back edge of the pillar 19.

In various embodiments, the area determination module 104 receives as input the angle data 114, and the head position data 112. The area determination module 104 uses the angle data 114 and the head position data 112 to determine an area outside of the vehicle 10 to be considered as a blind spot area and generates blind spot area data 116 based thereon.

Figure 3:
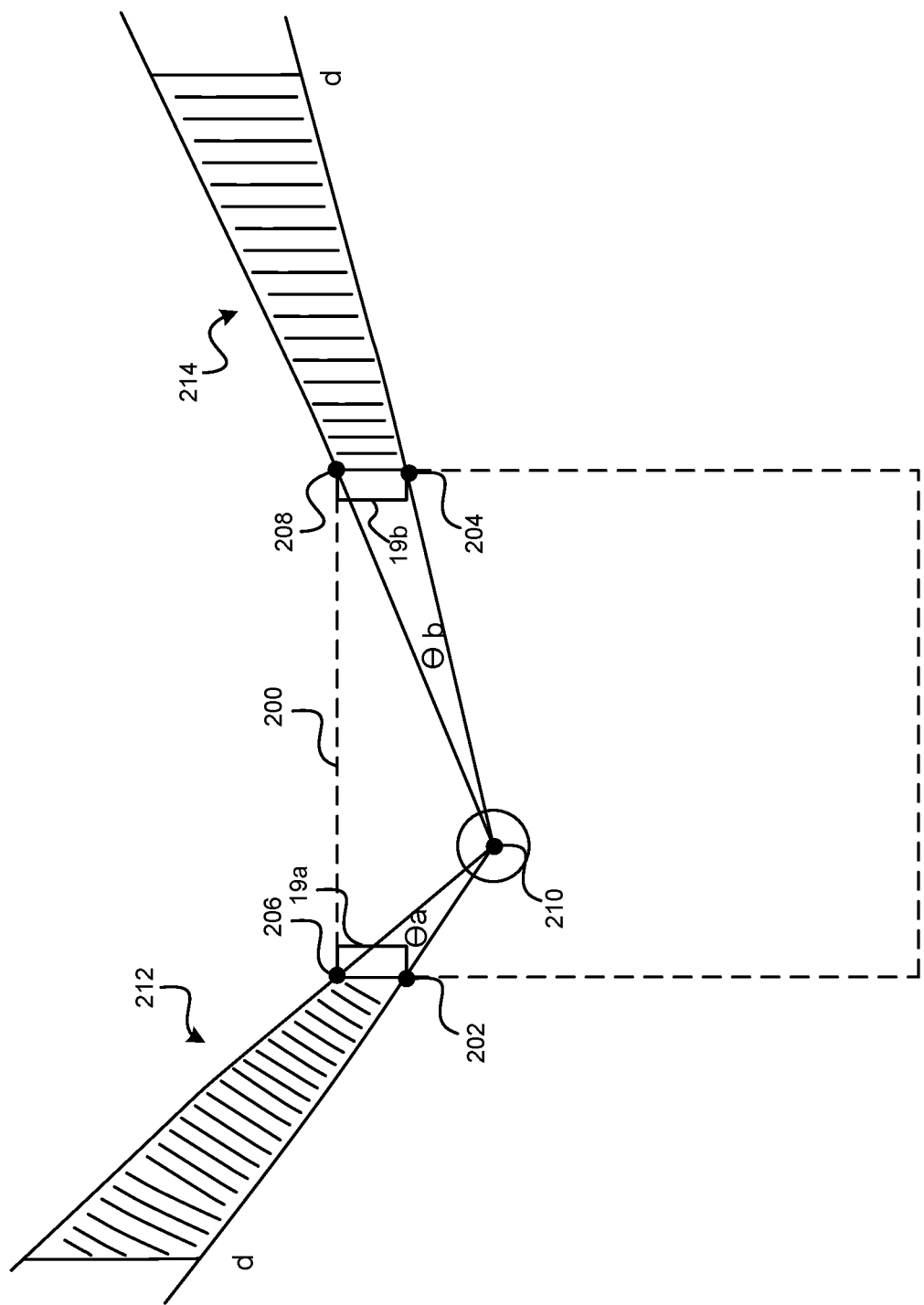
FIG. 3 is an illustration of the parameters used in the blind spot detection system, in accordance with various embodiments.

For example, as shown in FIG. 3, the area 212 is defined as including the space defined by the angle θa and between the vehicle 10 and a defined lateral distance $d_1$ from the vehicle 10; and the area 214 similarly is defined as including the space defined by the angle θb and between the vehicle 10 and a defined lateral distance $d_2$ from the vehicle 10.

With reference back to the blind spot monitoring module 106 receives as input the blind spot area data 116, and perception data 118. The perception data 118 includes an indication of objects detected by the sensor system 28 within the environment. The blind spot monitoring module 106 determines whether a position of detected objects is within the blind spot areas indicated by the blind spot area data 116. When the position of one or more objects falls within one or more of the blind spot areas, the blind spot monitoring module 106 generates notification data 120 to notify a driver of the vehicle 10 or a driver of another vehicle of the object(s) identified within the blind spot area. When the position of one or more objects falls within one or more of the blind spot areas, the blind spot monitoring module 106 generates decision and/or control data 122 initiate control of the vehicle 10 based on the object(s) identified within the blind spot area (for example to avoid collision with the object).

Referring now to FIG. 4 and with continued reference to FIGS. 1-3, a method 400 for determining a blind spot area of a vehicle is shown in accordance with embodiments. As can be appreciated, in light of the disclosure, the order of operation within the method 400 is not limited to the sequential execution as illustrated in FIG. 4 but may be performed in one or more varying orders as applicable and in accordance with the present disclosure.

In various embodiments, one or more steps of the method 400 may be removed or added without altering the spirit of the method 400.

In one example, the method may begin at 405. The head position data 112 is received at 410. The pillar position data 110 is retrieved from the pillar data datastore 108 at 420. Thereafter, the angle(s) θa, θb are determined at 430, for example, based on the relationship as discussed above. The determined angle(s) θa, θb are used to determine the blind spot area(s) 212, 214 outside of the vehicle 10 at 440. The blind spot area(s) 212, 214 is then monitored for objects at 450. When an object is present in the blind spot area(s) 212, 214 at 460, notification data 120 is generated and/or decision/control data 122 is generated at 470 and the method 400 continues with receiving head position data 112 at 410. When an object is not detected at 460, the method 400 continues with receiving the head position data 112 at 410. As can be appreciated, the method 400 may continue as long as the vehicle 10 is operating in a forward gear or range.

The disclosed embodiments of methods and systems herein thus provide improvements to the field of blind spot detection and vehicle controls.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for detecting a blind spot area of a vehicle, comprising:
   receiving, by a processor, head position data indicating a position of a head of a driver of the vehicle;
   determining, by the processor, pillar position data associated with at least one pillar of the vehicle, wherein the pillar position data includes a coordinate of a first point associated with a first edge of the at least one pillar and a coordinate of a second point associated with a second edge of the at least one pillar, wherein the first edge is a front edge that faces a forward direction of the vehicle, and wherein the second edge is a back edge that faces a backward direction of the vehicle;
   determining, by the processor, at least one angle based on the head position data and the pillar position data, wherein the determining the at least one angle is based on:

$$\theta = \text{Arctan}\left[\frac{\frac{H_y - A_y}{H_x - A_x} - \frac{H_y - B_y}{H_x - B_x}}{1 + \left(\frac{H_y - A_y}{H_x - A_x}\right) * \left(\frac{H_y - B_y}{H_x - B_x}\right)}\right],$$

where Hxy represents the coordinates of the position of the head of the driver, Axy represents the coordinates of the position of the front edge of the at least one pillar, and Bxy represents the position of the back edge of the at least one pillar;

determining, by the processor, at least one blind spot area based on the at least one angle;

detecting, by the processor, at least one object within the at least one blind spot area; and generating at least one of notification data, decision data, and control data based on the at least one object.

2. The method of claim 1, wherein the at least one pillar is a left front pillar of the vehicle.

3. The method of claim 1, wherein the at least one pillar is a right front pillar of the vehicle.

4. The method of claim 1, wherein the coordinate of the first point and the coordinate of the second point are two-dimensional coordinates.

5. The method of claim 1, wherein the generating comprises generating notification data, and wherein the notification data includes information associated with the detected object in the blind spot area.

6. The method of claim 1, wherein the generating comprises generating the decision data, and wherein the decision data is associated with an action of at least one of the vehicle and the driver.

7. The method of claim 1, wherein the generating comprises generating the control data, and wherein the control data controls at least one actuator of the vehicle.

8. The method of claim 1, wherein the determining the at least one blind spot area is further based on a position of the pillar and a defined distance from the vehicle.

9. A system for detecting a blind spot area of a vehicle, comprising:

a sensor system configured to provide head position data associated with a head of a driver of the vehicle;

a data storage system configured to provide pillar position data associated with at least one pillar of the vehicle, wherein the pillar position data includes a coordinate of a first point associated with a first edge of the at least one pillar and a coordinate of a second point associated with a second edge of the at least one pillar, wherein the first edge is a front edge that faces a forward direction of the vehicle, and wherein the second edge is a back edge that faces a backward direction of the vehicle; and a processor configured to receive the head position data and the pillar position data, determine at least one angle based on the head position data and the pillar position data and further based on:

$$\theta = \text{Arctan}\left[\frac{\frac{H_y - A_y}{H_x - A_x} - \frac{H_y - B_y}{H_x - B_x}}{1 + \left(\frac{H_y - A_y}{H_x - A_x}\right)*\left(\frac{H_y - B_y}{H_x - B_x}\right)}\right],$$

where Hxy represents the coordinates of the position of the head of the driver, Axy represents the coordinates of the position of the front edge of the at least one pillar, and Bxy represents the position of the back edge of the at least one pillar, determine at least one blind spot area based on the at least one angle, detect at least one object within the at least one blind spot area, and generate at least one of notification data, decision data, and control data based on the at least one object.

10. The system of claim 9, wherein the at least one pillar is a left front pillar of the vehicle or a right front pillar of the vehicle.

11. The system or claim 1, wherein the coordinate of the first point and the coordinate of the second point are two-dimensional coordinates.

12. The system of claim 9, wherein the generating comprises generating notification data, and wherein the notification data includes information associated with the detected object in the blind spot area.

13. The system of claim 9, wherein the generating comprises generating the decision data, and wherein the decision data is associated with an action of at least one of the vehicle and the driver.

14. The system of claim 9, wherein the generating comprises generating the control data, and wherein the control data controls at least one actuator of the vehicle.

15. A vehicle, comprising:

at least one pillar having a first edge is a font edge that faces a forward direction of the vehicle and a second edge that is a back edge that faces a backward direction of the vehicle;

a sensor system configured to provide head position data associated with a head of a driver of the vehicle;

a data storage system configured to provide pillar position data associated with at least one pillar of the vehicle, wherein the pillar position data includes a coordinate of a first point associated with the first edge of the at least one pillar and a coordinate of a second point associated with the second edge of the at least one pillar; and a processor configured to receive the head position data and the pillar position data, determine at least one angle based on the head position data and the pillar position data and further based on:

$$\theta = \text{Arctan}\left[\frac{\frac{H_y - A_y}{H_x - A_x} - \frac{H_y - B_y}{H_x - B_x}}{1 + \left(\frac{H_y - A_y}{H_x - A_x}\right)*\left(\frac{H_y - B_y}{H_x - B_x}\right)}\right],$$

where Hxy represents the coordinates of the position of the head of the driver, Axy represents the coordinates of the position of the front edge of the at least one pillar, and Bxy represents the position of the back edge of the at least one pillar, determine at least one blind spot area based on the at least one angle, detect at least one object within the at least one blind spot area, and generate at least one of notification data, decision data, and control data based on the at least one object.

16. The vehicle of claim 15, wherein the at least one pillar is a left front pillar of the vehicle.

17. The vehicle of claim 15, wherein the at least one pillar is a right front pillar of the vehicle.

18. The vehicle of claim 15, wherein the generating comprises generating notification data, and wherein the notification data includes information associated with the detected object in the blind spot area.

19. The vehicle of claim 15, wherein the generating comprises generating the decision data, and wherein the decision data is associated with an action of at least one of the vehicle and the driver.

20. The vehicle of claim 15, wherein the generating comprises generating the control data, and wherein the control data controls at least one actuator of the vehicle.

* * * * *